United States Patent Office 3,282,958
Patented Nov. 1, 1966

3,282,958
DERIVATIVES OF 4b,5,9b,10 TETRAHYDRO-4b,9b-DIPHENYLINDOLO-[3,2-b] INDOLE AND PROCESS FOR THEIR PREPARATION
Werner Metlesics, Clifton, and Leo Henryk Sternbach, Upper Montclair, N.J., assignors to Hoffmann-La Roche Inc., Nutley, N.J., a corporation of New Jersey
No Drawing. Filed May 19, 1965, Ser. No. 457,180
5 Claims. (Cl. 260—326.9)

The present invention relates to diazocine derivatives. More particularly, it relates to reduction products of diazocines, and to processes for their preparation.

5.6-dihydro diazocines of the invention have the formula

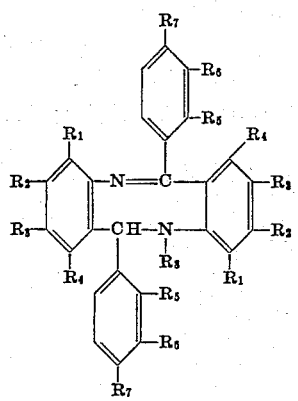

(I)

wherein $R_1$ through $R_4$ are hydrogen, halogen, e.g. F, Cl, or Br, lower alkoxy, lower alkylthio, or trifluoromethyl, and $R_1$ through $R_4$ can be the same or different, except that at least one of $R_1$ through $R_4$ must be selected from halogen, lower alkoxy, lower alkylthio or trifluoromethyl; $R_5$ through $R_7$ are hydrogen, halogen, e.g. F, Cl, or Br, lower alkoxy, lower alkylthio, lower alkyl, or trifluoromethyl, and $R_5$ through $R_7$ can be the same or different; and $R_8$ is hydrogen or lower alkyl.

Preferred compounds with the above formula have the formula

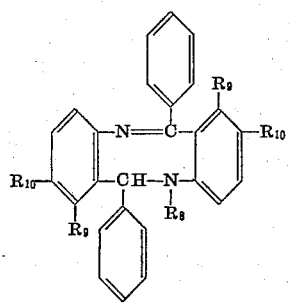

(II)

wherein $R_8$ is hydrogen or lower alkyl and $R_9$ and $R_{10}$ are hydrogen, halogen, e.g. fluorine, chlorine or bromine, preferably chlorine, or trifluoromethyl; except, however, at least one but not both of $R_9$ and $R_{10}$ is hydrogen.

Another group of further reduced diazocines within the scope of the invention are those having the formula

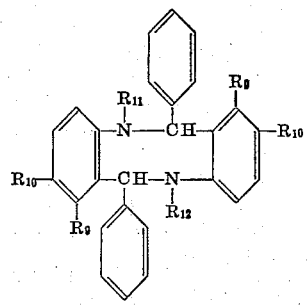

(III)

wherein $R_9$ and $R_{10}$ have the same meaning as given above for the compounds of Formula II and $R_{11}$ and $R_{12}$ are hydrogen, lower alkyl, preferably methyl, or, when taken together, form a methylene bridge between the nitrogen atoms.

Another group of compounds within the scope of the invention are those having the formula

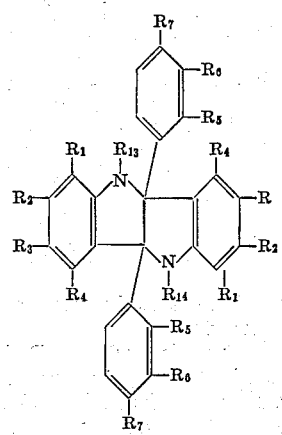

(IV)

wherein $R_1$ through $R_4$ are hydrogen, halogen, e.g. F, Cl, or Br, lower alkoxy, lower alkylthio, or trifluoromethyl, and $R_1$ through $R_4$ can be the same or different, except that at least one of $R_1$ through $R_4$ must be selected from halogen, lower alkoxy, lower alkylthio or trifluoromethyl; $R_5$ through $R_7$ are hydrogen, halogen, e.g. F, Cl, or Br, lower alkoxy, lower alkylthio, lower alkyl or trifluoromethyl, and $R_5$ through $R_7$ can be the same or different; and $R_{13}$ and $R_{14}$ are hydrogen or lower alkyl.

Preferred compounds within the above class are those having the formula

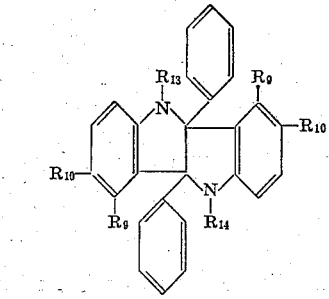

(V)

wherein $R_{13}$ and $R_{14}$ are hydrogen or lower alkyl and $R_9$ and $R_{10}$ are hydrogen or halogen, e.g., fluorine, chlorine or bromine, preferably chlorine, or trifluoromethyl, except, however, at least one but not both of $R_9$ and $R_{10}$ is hydrogen.

The compounds of Formulas I through V exhibit estrogenic activity and are useful as estrogens. Additionally, many of the compounds within the above genera exhibit antigonadotropic and/or blood pressure lowering activity and are useful as antigonadotropins and/or hypotensive agents. For example, 3,8-dichloro-4b,5,9b,10 - tetrahydro - 4b,9b - diphenylindolo[3,2 - b] indole; 2,8-dichloro-5,6 - dihydro - 6,12 - diphenyldibenzo [b,f][1,5]diazocine; and 2,8 - dichloro - 5,6 - dihydro - 5-methyl-6,12-diphenyldibenzo[b,f][1,5]diazocine are very active antigonadotropins, and 3,8-dichloro-4b,5,9b,10-tetrahydro-5,10-dimethyl - 4b,9b - diphenylindolo[3,2-b] indole is a very active hypotensive agent.

The term "lower alkyl" used in the specification and claims is to be understood to mean a straight or branched chain alkyl group having from 1 to 7 carbon atoms, e.g., methyl, ethyl, propyl, butyl, isopropyl, hexyl, heptyl, etc. and is preferably methyl.

The novel compounds of the invention are prepared by reducing a compound of the formula

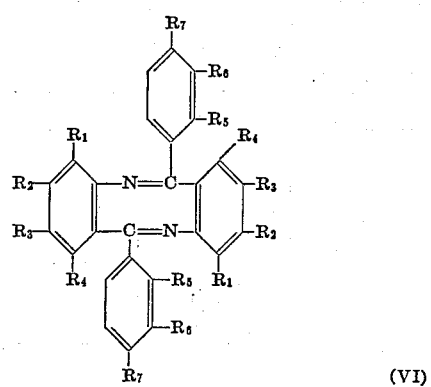

(VI)

wherein $R_1$ through $R_7$ have the same meaning as in the compounds of Formula I.

Compounds of Formula I wherein $R_8$ is hydrogen are prepared by reducing a compound of Formula VI with a Group I metal-Group III metal hydride, preferably in the presence of a solvent, e.g., pyridine. Alternatively, the reduction reaction can be carried out with dimethyl-amino-borane in acetic acid, although in somewhat lower yield. Compounds of Formula I wherein $R_8$ is lower alkyl can either be prepared (a) from compounds of Formula I wherein $R_8$ is hydrogen by reaction with a lower alkylating agent, e.g., a lower alkyl halide, a di-lower alkyl sulfate, etc. or (b) from alkyl addition salts of compounds of Formula I, e.g., from the dimethyl sulfate salt, by reduction with a Group I metal-Group III metal hydride.

Compounds of Formula III can be prepared by reacting a compound of Formula VI with hydrogen in the presence of a hydrogenation catalyst, such as platinum, in a hydrogenation solvent such as acetic acid. Alternatively, a Group I metal-Group III metal hydride can be employed using a liquid aliphatic or cycloaliphatic ether solvent, such as tetrahydrofuran, diethyl ether, etc. Alternatively, compounds of Formula III can be prepared from compounds of Formula I by employing the above reducing agents. Where $R_{11}$ or $R_{12}$ is other than hydrogen, the lower alkylation reaction can be carried out as described above for compounds of Formula I.

When it is desired to have $R_{11}$ and $R_{12}$ the same lower alkyl group, the alkylation reaction is carried out on a compound of Formula III wherein $R_{11}$ and $R_{12}$ are hydrogen. When it is desired to have $R_{11}$ a different lower alkyl group than $R_{12}$, a compound of Formula I wherein $R_8$ is one lower alkyl group is reduced to a compound of Formula III, and a lower alkylation reaction performed thereon using a different alkylating agent. Of course, it is understood that the starting materials of Formula VI or Formula I employed in the reduction will be chosen so as to have the proper groups $R_9$ and $R_{10}$ with no other groups attached to the benzene nuclei. The compounds of Formula III wherein $R_{11}$ and $R_{12}$ form a methylene bridge between the nitrogen atoms are prepared by reacting a compound of Formula III wherein $R_{11}$ and $R_{12}$ are both hydrogen with formaldehyde.

Compounds of Formula IV are prepared by reacting a compound of Formula I with hydrogen in the presence of a hydrogenation catalyst, such as platinum, in a hydrogenation solvent such as acetic acid. Alternatively, the reduction can be carried out using nascent hydrogen, e.g. produced by metals such as zinc, tin, iron, etc. in a basic or an acidic medium, preferably acetic acid.

The starting materials of Formula VI are prepared in accordance with the process given in copending application Serial No. 263,411, filed March 7, 1963 to Werner Metlesics and Leo Henryk Sternbach, and now abandoned.

The invention will be further understood by reference to the following examples which are given for illustration purposes only and are not meant to limit the invention.

EXAMPLE 1

*2,8-dichloro-5,6-dihydro-6,12-diphenyldibenzo[b,f][1,5] diazocine*

To a solution of 86.8 grams (0.203 mole) of 2,8-dichloro-6,12 - diphenyldizenzo[b,f][1,5]diazocine in 1000 ml. of pyridine cooled to 10° in an ice bath are added 7.6 grams (0.20 mole) of lithium aluminum hydride in small portions with stirring. The cooling is discontinued after 15-30 minutes and the dark brown solution is stirred at 25° for 16 hours. The solution is cooled in an ice bath, 1000 ml. of wet ether and 30 grams of ice added in small portions, and the mixture stirred for 1-2 hours at 25°. The solution is filtered through "Celite" and the solvent removed in vacuo to give yellow needles of 2,8-dichloro-5,6 - dihydro - 6,12 - diphenyldibenzo[b,f][1,5]diazocine which, after recrystallization from a mixture of methylene chloride and ethanol, melt at 200–208°. (Sometimes remainders are observed up to 230°.)

The above compound is also obtained by reduction of 2,8-dichloro-6,12-diphenyldibenzo[b,f][1,5]diazocine with dimethylamineborane in acetic acid.

EXAMPLE 2

*2,8-dichloro-5,6-dihydro-5-methyl-6,12-diphenyldibenzo [b,f][1,5]diazocine*

To a solution of 4.3 grams (0.01 mole) of 2,8-dichloro-5,6 - dihydro-6,12-diphenyldibenzo[b,f][1,5]diazocine in 35 ml. of dimethylformamide 3.0 grams of a 50 percent suspension of sodium hydride in mineral oil is added and the mixture stirred for 15 minutes. After addition of 5 ml. of methyl iodide the stirring is continued for 5 minutes. The mixture is poured on ice and extracted with ether. On concentrating the ether a small amount of 3,8-dichloro - 4b,5,9b,10 - tetrahydro-5,10 - dimethyl-4b,9b-di phenylindolo[3,2-b]indole (0.2 gram) is isolated and identified in the usual way. The main product, 2,8-dichloro-5,6-dihydro-5-methyl - 6,12 - diphenyldibenzo[b,f] [1,5]diazocine, melting at 177–180° is obtained on addition of hexane.

EXAMPLE 3

*Cis 2,8-dichloro-5,6,11,12-tetrahydro-6,12-diphenyldibenzo[b,f][1,5]diazocine*

A solution of 85.8 grams (0.2 mole) of 2,8-dichloro-5,6 - dihydro-6,12-diphenyldibenzo[b,f][1,5]diazocine in 700 ml. of tetrahydrofuran is added dropwise to a stirred solution of 11.3 grams (0.3 mole) of lithium aluminum hydride in 500 ml. of tetrahydrofuran. Throughout the addition (ca. 45 minutes) the temperature is kept below 10° by an ice bath. The mixture is then heated to reflux for 16 hours, cooled and after addition of 600 ml. of wet ether and 25 ml. of water stirred for 2 hours. The solution is filtered through "Celite" and the filter cake washed with 1000 ml. of tetrahydrofuran. The solvent is removed in vacuo and the residue repeatedly recrystallized from benzene to yield cis 2,8-dichloro-5,6,11,12-tetrahydro-6,12-diphenyldibenzo[b,f][1,5]diazocine in the form of white prisms melting at 225–227°.

EXAMPLE 4

*Trans 2,8-dichloro-5,6,11,12-tetrahydro-6,12-diphenyldibenzo[b,f][1,5]diazocine*

To a stirred solution of 50 grams (0.117 mole) of 2,8-dichloro-6,12-diphenyldibenzo[b,f][1,5]diazocine in 2500 ml. of ether is added 5.5 grams (0.145 mole) of lithium aluminum hydride. The solution is heated to reflux for 16 hours, cooled in an ice bath and 28 ml. of 2 N sodium hydroxide is added dropwise. After stirring for 2 hours the solids are filtered from the solution. The filter cake is extracted with 1000 ml. of boiling tetrahydrofuran and the suspension filtered hot. Ethyl acetate is added to the filtrate and the tetrahydrofuran removed in vacuo. White prisms of trans 2,8-dichloro-5,6,11,12-tetrahydro-6,12-diphenyldibenzo[b,f][1,5]diazocine are obtained, melting at 244–247°. This compound holds solvents tenaciously and has to be dried in vacuo at 160°.

EXAMPLE 5

*Cis 2,8-dichloro-5,6,11,12-tetrahydro-5-methyl-6,12-diphenyldibenzo[b,f][1,5]diazocine*

A solution of 8.6 grams (0.019 mole) of 2,8-dichloro-5,6-dihydro-5-methyl-6,12-diphenyldibenzo[b,f][1,5]diazocine in 120 ml. of tetrahydrofuran containing 1.5 grams (0.04 mole) of lithium aluminum hydride is heated to reflux for 16 hours. The solution is cooled and 7 ml. of water added. After filtration through "Celite" a clear solution is obtained which leaves a crystalline residue on evaporation. Recrystallization from a mixture of benzene and petroleum ether gives cis 2,8-dichloro-5,6,11,12-tetrahydro-5-methyl-6,12-diphenyldibenzo[b,f][1,5]diazocine in the form of white prisms melting at 183–184°.

EXAMPLE 6

*Trans 2,8-dichloro-5,6,11,12-tetrahydro-5-methyl-6,12-diphenyldibenzo[b,f][1,5]diazocine*

To a solution of 4 grams (0.009 mole) of the cis isomer prepared in Example 5 in 75 ml. of dimethylformamide prepared under nitrogen is added 4 grams of a 50 percent suspension of sodium hydride in mineral oil. The mixture is stirred at 50° for 2 hours, poured into ice water and extracted with ether. The ether is dried and evaporated and the residue chromatographed on 150 grams of alumina (Woelm, No. 1, acidic). With benzene, some cis isomer is obtained. Further elution with ethylacetate and methylene chloride gives white prisms of the above trans isomer which, after recrystallization from a mixture of benzene and hexane, melts at 187–189°.

EXAMPLE 7

*Cis 2,8-dichloro-5,6,11,12-tetrahydro-5,11-dimethyl-6,12-diphenyl-dibenzo[b,f][1,5]diazocine*

A solution of 4.3 grams (0.01 mole) of cis 2,8-dichloro-5,6,11,12-tetrahydro-6,12-diphenyldibenzo[b,f][1,5]diazocine, prepared in Example 3, in 30 ml. of dimethylformamide is prepared under nitrogen. After addition of 1 gram of a 50 percent suspension of sodium hydride in mineral oil and 15 minutes stirring 1.5 ml. (0.024 mole) of methyl iodide is added and the stirring continued for 15 minutes. This procedure is repeated (1 gram of 50 percent sodium hydride, 15 minutes stirring, 3 ml. of methyl iodide, 30 minutes stirring) and the resulting mixture poured into ice water and extracted with ether. Evaporation of the ether leaves a crystalline residue which, after recrystallization from a mixture of methylene chloride and ethanol, gives cis 2,8-dichloro-5,6,11,12-tetrahydro-5,11-dimethyl-6,12-diphenyldibenzo[b,f][1,5]diazocine in the form of white prisms melting at 214–216°.

EXAMPLE 8

*Trans 2,8-dichloro-5,6,11,12-tetrahydro-5,11-dimethyl-6,12-diphenyldibenzo[b,f][1,5]diazocine*

A solution of 4.3 grams (0.01 mole) of trans 2,8-dichloro-5,6,11,12-tetrahydro-6,12-diphenyldibenzo[b,f][1,5]diazocine, prepared in Example 4, is prepared in 50 ml. of dimethylformamide under nitrogen. The solution is cooled to 3° and 1.5 grams of a 50 percent suspension of sodium hydride in mineral oil is added. Stirring is continued for 1½ hours at a temperature of ca. 5–10°, then 10 ml. of methyl iodide is added slowly and the stirring continued for 1 hour at 25°. The mixture is poured into ice water and extracted with ether. Evaporation of the ether leaves a crystalline residue which is dissolved in benzene, filtered through acidic alumina and recrystallized from ether. White prisms of trans 2,8-dichloro-5,6,11,12-tetrahydro-5,11-dimethyl-6,12-diphenyldibenzo[b,f][1,5]diazocine are obtained which melt at 207–209°.

EXAMPLE 9

*Cis-exo 2,8-dichloro-6,12-diphenyl-6H,12H-5,11-methanodibenzo[b,f][1,5]diazocine*

A suspension of 10.0 grams (0.023 mole) of cis 2,8-dichloro-5,6,11,12-tetrahydro-6,12-diphenyldibenzo[b,f][1,5]diazocine, prepared in Example 3, in a mixture of 6.5 ml. of 98 percent formic acid and 5.0 ml. 37 percent of aqueous formaldehyde and 100 ml. of nitromethane is heated on a steam bath for 6½ hours and left at 25° for 16 hours. After cooling the precipitate is filtered from the solution and recrystallized from a mixture of methylene chloride and ethanol to give cis-exo 2,8-dichloro-6,12-diphenyl-6H,12H-5,11-methanodibenzo[b,f][1,5]diazocine in the form of white needles melting at 279–281°.

EXAMPLE 10

*Trans 2,8-dichloro-6,12-diphenyl-6H,12H-5,11-methanodibenzo[b,f][1,5]diazocine*

To a solution of 20 grams (0.046 mole) of trans 2,8-dichloro-5,6,11,12-tetrahydro-6,12-diphenyldibenzo[b,f][1,5]diazocine, prepared in Example 4, in 600 ml. of toluene 10 grams of para-formaldehyde is added and the mixture heated to reflux for 16 hours. Para-formaldehyde is filtered from the solution which is removed in vacuo to give white needles which, after recrystallization from a mixture of methylene chloride and ethanol, melt at 187–192° (sometimes remainders up to 220°).

EXAMPLE 11

*3,8-dichloro-4b,5,9b,10-tetrahydro-4b,9b-diphenylindolo[3,2-b]indole*

A solution of 85.4 grams (0.2 mole) of 2,8-dichloro-6,12-diphenyldibenzo[b,f][1,5]diazocine in 1000 ml. of acetic acid containing ca. 25 grams of hydrogen chloride is hydrogenated at 25° and atmospheric pressure using 2 grams of platinum oxide as catalyst. During the rapid uptake of hydrogen, a white salt precipitates from the solution and the consumption stops after the uptake of 5500 ml. of hydrogen. (0.2 Mole=4800 ml.+500 ml. for the catalyst). The solution is filtered from the crystalline precipitate and the catalyst, and discarded. The solid part is suspended in ice water and made basic with aqueous ammonia. The product is extracted with ether. The ether solution is washed with water, dried with sodium sulfate and evaporated to dryness. The residue is recrystallized from a mixture of methylene chloride and methanol to give 3,8-dichloro-4b,5,9b,10-tetrahydro-4b, 9b-diphenylindolo[3,2-b]indole in the form of white prisms melting at 225–228°. A sample obtained by chromatography on basic alumina using benzene as eluent melts at 228–230°.

EXAMPLE 12

3,8-dichloro-4b,5,9b,10-tetrahydro-5-methyl-4b,9b-diphenylindolo[3,2-b]indole

A solution of 86 grams (0.2 mole) of 2,8-dichloro-6, 12-diphenyldibenzo[b,f][1,5]diazocine in 450 ml. of benzene and 50 ml. (0.54 mole) of dimethyl sulfate is heated to reflux for 16 hours. On cooling the red solution precipitates yellow crystals which are collected on a filter and washed with benzene. Recrystallization from a mixture of methylene chloride and ether gives tan prisms of 2,8-dichloro - 5 - methyl - 6,12 - diphenyldibenzo[b,f] [1,5]diazocinium methyl sulfate melting at ca. 150–205° (dec.).

A solution of 81.7 grams (0.148 mole) of the above sulfate salt in 700 ml. of acetic acid containing ca. 25 grams of hydrogen chloride is hydrogenated at 25° and 1 atm. using 2 grams of platinum oxide as catalyst. During the reaction a white salt precipitates from the solution and the uptake of hydrogen stops at ca. 4900 ml. (expected uptake ca. 3600 ml. [0.148 mole] plus 500 ml. from catalyst). The precipitate is filtered from the solution and washed with acetic acid. The filter cake is basified with ice and ammonia and the resulting mixture extracted with methylene cholride. The extract after drying over sodium sulfate, concentrating and addition of ether gives white prisms of 3,8-dichloro-4b,5,9b,10-tetrahydro-5-methyl - 4b,9b - diphenylindolo[3,2-b]indole melting at 229–2310.

EXAMPLE 13

3,8 - Dichloro - 4b,5,9b,10 - tetrahydro-5,10-dimethyl-4b, 9b-diphenyl-indolo[3,2-b]indole To a solution of 8.6 grams of 3,8-dichloro-4b,5,9b,10-tetrahydro-4b,9b-diphenylindolo[3,2-b]indole, prepared in Example 11, in 75 ml. of dimethylformamide prepared under nitrogen is added 6.0 grams of a 50 percent suspension of sodium hydride in mineral oil. The mixture is stirred and heated to 55° for 30 minutes and cooled in a nice bath. After the addition of 10 ml. (0.16 mole) of methyl iodide, stirring is continued for 1 hour at 25° and the mixture poured into ice water. Extracation with methylene chloride and replacement of this solvent by ethanol leads to the isolation of 3,8-dichloro-4b,5,9b,10-tetrahydro-5,10-dimethyl-4b,9b-diphenylindolo[3,2-b]indole in the form of white prisms melting at 253–256°. Recrystallization from a mixture of benzene and hexane gives white prisms melting at 261–263°.

EXAMPLE 14

3,8 - dichloro-4b,5,9b,10-tetrahydro-4b,9b-diphenylindolo [3,2-b]-indole

To a solution of 2 grams of 2,8-dichloro-6,12-diphenyldibenzo[b,f][1,5]diazocine in a mixture of 25 ml. of methylene chloride, 50 ml. of acetic acid in 5 ml. of water is added 7 grams of zinc dust. The mixture is stirred for 2 hours, poured into ice water, made alkaline with sodium hydroxide and extracted with ether. Evaporation of the ether gives white prisms of 3,8-dichloro-4b,5,9b,10-tetrahydro-4b,9b-diphenylindolo[3,2-b]-indole, which, after recrystallization from methanol, melt at 227–229°.

EXAMPLE 15

2,8 - dichloro-5,6 - dihydro-5-methyl-6,12-diphenyldibenzo [b,f][1,5]-diazocine

To a stirred, ice cold suspension of 82.3 grams (0.149 mole) of 2,8-dichloro-5-methyl-6,12-diphenyldibenzo[b,f] [1,5]diazocininum methyl sulfate (prepared in Example 12) is added 8.2 grams (0.22 mole) of sodium borohydride. After stirring for one hour at 25° C., 750 ml. of water is added slowly and the mixture left at 25° C. for 16 hours. A yellow precipitate forms from which the solvent is decanted. The precipitate is dissolved in methylene chloride, ethanol added thereto, followed by concentration of the resulting mixture to give 2,8-dichloro-5,6-dihydro-5-methyl-6,12-diphenyldibenzo[b,f][1,5] diazocine in the form of pale yellow prisms melting at 181°–184° C.

We claim:
1. A compound of the formula

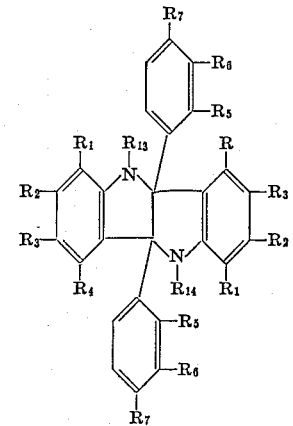

wherein $R_1$, $R_2$, $R_3$ and $R_4$ are selected from the group consisting of hydrogen, halogen, lower alkoxy, lower alkylthio, and trifluoromethyl, except that at least one of $R_1$, $R_2$, $R_3$, and $R_4$ is other than hydrogen; $R_5$, $R_6$, and $R_7$ are selected from the group consisting of hydrogen, halogen, lower alkoxy, lower alkylthio, lower alkyl and trifluoromethyl; and $R_{13}$ and $R_{14}$ are selected from the group consisting of hydrogen and lower alkyl.

2. A compound of the formula

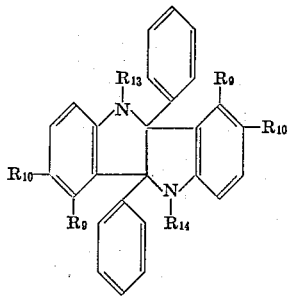

wherein $R_9$ and $R_{10}$ are selected from the group consisting of hydrogen, halogen, and trifluoromethyl, wherein at least one but not both of $R_9$ and $R_{10}$ is hydrogen, and $R_{13}$ and $R_{14}$ are selected from the group consisting of hydrogen and lower alkyl.

3. 3,8-dichloro-4b,5,9b,10-tetrahydro-4b,9b-diphenylindolo-[3,2-b]indole.

4. 3,8-dichloro - 4b,5,9b,10 - tetrahydro-5,10-dimethyl-4b,9b-diphenylindolo[3,2-b]indole.

5. A process for the preparation of a compound of the formula

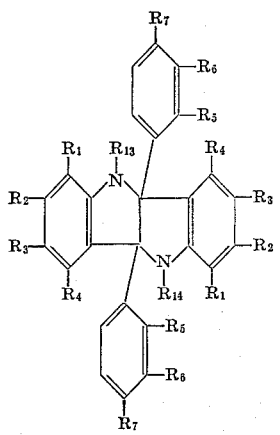

(IV)

wherein $R_1$, $R_2$, $R_3$ and $R_4$ are selected from the group consisting of hydrogen, halogen, lower alkoxy, lower alkylthio and trifluoromethyl, except that at least one of $R_1$, $R_2$, $R_3$ and $R_4$ is other than hydrogen; $R_5$, $R_6$ and $R_7$ are selected from the group consisting of hydrogen, halogen, lower alkoxy, lower alkylthio, lower alkyl and trifluoromethyl; and $R_{13}$ and $R_{14}$ are selected from the group consisting of hydrogen and lower alkyl comprising reacting a compound of the formula

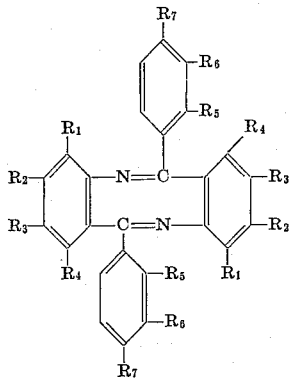

(VI)

wherein $R_1$ through $R_7$ have the meaning given above with hydrogen in the presence of a hydrogenation catalyst in acetic acid in the presence of hydrogen chloride.

No references cited.

ALEX MAZEL, *Primary Examiner.*

MARY U. O'BRIEN, *Assistant Examiner.*